US012661580B2

(12) United States Patent
Wei

(10) Patent No.: US 12,661,580 B2
(45) Date of Patent: Jun. 23, 2026

(54) METHOD OF OPERATING GAME MACHINE

(71) Applicant: PAOKAI ELECTRONIC ENTERPRISE CO., LTD., Kaohsiung City (TW)

(72) Inventor: Ming-Shan Wei, Kaohsiung City (TW)

(73) Assignee: PAOKAI ELECTRONIC ENTERPRISE CO., LTD., Kaohsiung City (TW)

( * ) Notice: Subject to any disclaimer, the term of this patent is extended or adjusted under 35 U.S.C. 154(b) by 605 days.

(21) Appl. No.: 18/302,902

(22) Filed: Apr. 19, 2023

(65) Prior Publication Data

US 2024/0165500 A1 May 23, 2024

(30) Foreign Application Priority Data

Nov. 22, 2022 (TW) .................................. 111144624

(51) Int. Cl.
*A63F 9/30* (2006.01)
*G07F 17/32* (2006.01)

(52) U.S. Cl.
CPC ............ *A63F 9/30* (2013.01); *G07F 17/3297* (2013.01)

(58) Field of Classification Search
CPC ............................... A63F 9/30; G07F 17/3297
USPC .......................................................... 273/447
See application file for complete search history.

(56) References Cited

U.S. PATENT DOCUMENTS

2022/0168906 A1 6/2022 Lin

FOREIGN PATENT DOCUMENTS

| | | | | |
|---|---|---|---|---|
| CN | 111127774 | A | | 5/2020 |
| JP | 2008099926 | A | * | 5/2008 |
| JP | 2019181251 | A | | 10/2019 |
| TW | I584859 | B | | 6/2017 |
| TW | M631919 | U | | 9/2022 |

OTHER PUBLICATIONS

Search Report appended to an Office Action, which was issued to Taiwanese counterpart application No. 111144624 by the TIPO on Jul. 28, 2023, with an English translation thereof; pp. 1-2.
An Office Action, which was issued to Japanese counterpart application No. 2023-062190 by the JPO on May 7, 2024.

* cited by examiner

*Primary Examiner* — Eugene L Kim
*Assistant Examiner* — Saba N. Ali
(74) *Attorney, Agent, or Firm* — MUNCY, GEISSLER, OLDS & LOWE, P.C.

(57) ABSTRACT

A method of operating a game machine including a grabbing device, a driving device, and a cabinet that defines an inner space is provided. The grabbing device includes a string and a claw. The method includes steps of: the driving device moving the grabbing device, in the inner space, horizontally from an original location to an upper location, and then releasing the string to lower the claw from the upper location to a lower location; when the claw reaches the lower location, the driving device outputting a first voltage to the grabbing device to perform a grabbing action; after performing the grabbing action, the driving device outputting a second voltage to the grabbing device for reducing grip strength of the claw for a predetermined time period; and the driving device outputting a third voltage to the grabbing device for increasing grip strength of the claw after outputting the second voltage.

12 Claims, 4 Drawing Sheets

METHOD OF OPERATING GAME MACHINE

CROSS-REFERENCE TO RELATED APPLICATION

This application claims priority to Taiwanese Invention Patent Application No. 111144624, filed on Nov. 22, 2022.

FIELD

The disclosure relates to a method of operating a game machine, and more particularly to a method of operating a claw machine.

BACKGROUND

A conventional claw machine generally includes a grabbing device for grabbing an object inside the claw machine and a driving device for outputting voltage to the grabbing device, and requires setting of a grip strength of the grabbing device. A conventional method of setting the grip strength is done manually. When setting the grip strength of the grabbing device manually, the grabbing device is first controlled by a user to grab the object, and then the user gradually decreases a voltage outputted by the driving device to the grabbing device, until the object drops from the grabbing device. The user then records a value of the voltage outputted by the driving device when the object drops, and finally, the user makes adjustments to the voltage outputted by the driving device according to the value thus recorded to control difficulty of the game. However, setting the grip strength manually is time consuming and may have greater uncertainties.

In addition, the grabbing device of the conventional claw machine, after grabbing the object, may drop the object unexpectedly, which may cause players to feel deceived.

SUMMARY

Therefore, an object of the disclosure is to provide a method of operating a game machine that can alleviate at least one of the drawbacks of the prior art.

According to the disclosure, a method of operating a game machine is provided. The game machine includes a grabbing device, a driving device, and a cabinet that defines an inner space. The grabbing device includes a string having one end connected to the driving device, and a claw fixedly connected to the other end of the string. The inner space has a start zone and a playing field, where the playing field allows an object to be placed therein and has a main zone and a drop zone that is between the start zone and the main zone. The method includes steps of: the driving device moving the grabbing device horizontally from an original location in the start zone to an upper location in the playing field, and then releasing the string to lower the claw from the upper location to a lower location in the playing field; when the claw is lowered to the lower location, the driving device outputting a first voltage to the grabbing device for the claw to perform a grabbing action; after performing the grabbing action, the driving device outputting a second voltage that is smaller than the first voltage to the grabbing device for reducing grip strength of the claw; and the driving device outputting a third voltage that is greater than the second voltage and smaller than the first voltage to the grabbing device for increasing the grip strength of the claw after outputting the second voltage for a predetermined time period.

According to the disclosure, a game machine includes a cabinet, a grabbing device, and a driving device. The cabinet defines an inner space that has a start zone and a playing field. The playing field allows an object to be placed therein and has a main zone and a drop zone that is between the start zone and the main zone. The grabbing device includes a string that has one end connected to a driving device, and a claw that is fixedly connected to the other end of the string. The driving device is configured to: move the grabbing device horizontally from an original location in the start zone to an upper location in the playing field, and then release the string to lower the claw from the upper location to a lower location in the playing field; output a first voltage to the grabbing device for the claw to perform a grabbing action when the claw is lowered to the lower location; output a second voltage that is smaller than the first voltage to the grabbing device for reducing grip strength of the claw after performing the grabbing action; and output a third voltage that is greater than the second voltage and smaller than the first voltage to the grabbing device for increasing the grip strength of the claw after outputting the second voltage for a predetermined time period.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
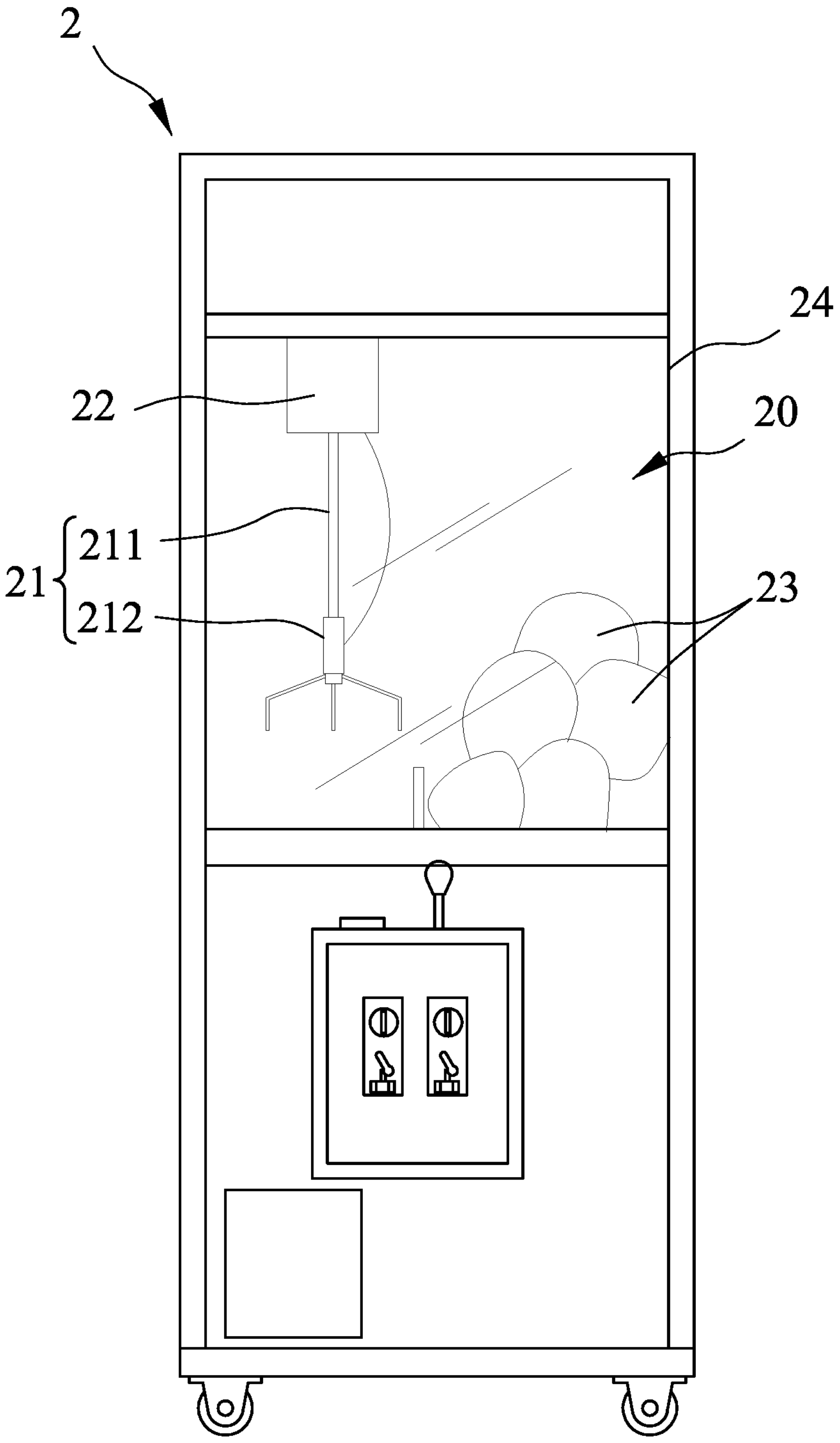
FIG. 1 is a front view of a game machine according to an embodiment of the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
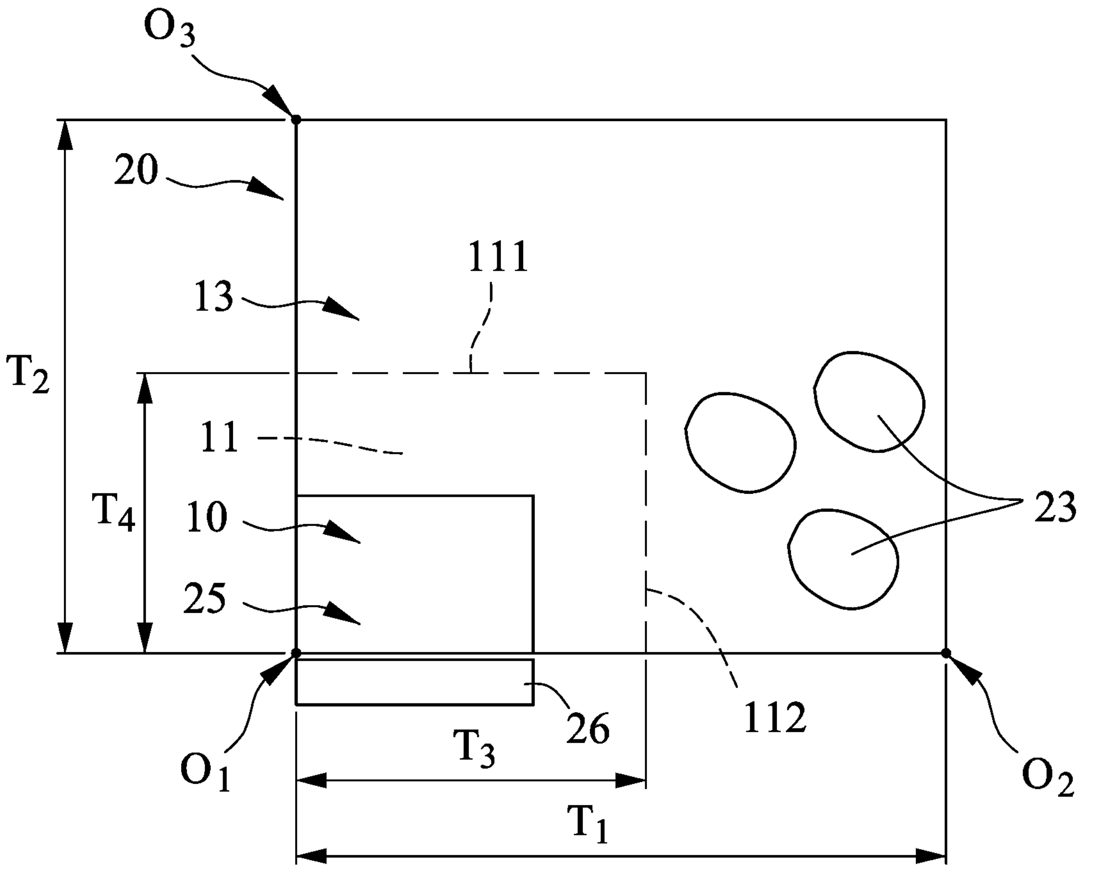
FIG. 2 is a schematic view illustrating a playing field of the game machine according to an embodiment of the disclosure.

Referring to FIGS. 1 and 2, a method of operating a game machine 2 according to an embodiment of the disclosure is provided. In this embodiment, the game machine 2 is a claw machine, and includes a grabbing device 21, a driving device 22, and a cabinet 24.

The grabbing device 21 is electrically connected to the driving device 22, and includes a string 211 that has one end connected to the driving device 22, and a claw 212 that is fixedly connected to the other end of the string 211. The claw 212 may move vertically as the string 211 is released and pulled by the driving device 22, and is electrically connected to the driving device 22. The driving device 22 is configured to move the grabbing device 21 horizontally and output different voltages to the claw 212 to adjust a grip strength of the claw 212 (i.e., a greater voltage provides a stronger grip strength of the claw 212).

The cabinet 24 defines an inner space 20 that has a start zone 10 and a playing field 11, 13, where the playing field 11, 13 allows a plurality of objects 23 to be placed therein and has a main zone 13 and a drop zone 11 that is between the start zone 10 and the main zone 13. The drop zone 11 is defined by a moving time of the grabbing device 21 in the inner space 20.

To describe in further detail, the inner space 20 has a rectangular top view and four corners. The driving device 22 moves the grabbing device 21 horizontally along a boundary of the inner space 20 from a first one of the four corners ($O_1$) to a second one of the four corners ($O_2$) that is adjacent to the first one of the four corners ($O_1$) to obtain a first time period ($T_1$), and moves the grabbing device 21 from the first one of the four corners ($O_1$) to a third one of the four corners ($O_3$) that is adjacent to the first one of the four corners ($O_1$) and that is opposite to the second one of the four corners ($O_2$) to obtain a second time period ($T_2$).

Then, the driving device 22 defines the drop zone 11 by defining a first line 111 that is parallel to a segment of boundary of the inner space 20 between the first one of the four corners ($O_1$) and the second one of the four corners ($O_2$), and a second line 112 that is perpendicular to the first line 111. The first line 111 has a first length which will take the grabbing device 21 a third time period ($T_3$) to move, where the third time period ($T_3$) is equal to the first time period ($T_1$) multiplied by a first predetermined value (x) that is greater than zero and less than one. The second line 112 has a second length which will take the grabbing device 21 a fourth time period ($T_4$) to move, where the fourth time period ($T_4$) is equal to the second time period ($T_2$) multiplied by a second predetermined value (y) that is greater than zero and less than one. The drop zone 11 and the start zone 10 together form a rectangle that has a length of the first length and a width of the second length. The first predetermined value (x) and the second predetermined value (y) may be identical to or different from each other.

For example, assuming that the first time period ($T_1$) is 1.8 seconds, the second time period ($T_2$) is 1.5 seconds, and the first predetermined value (x) and the second predetermined value (y) are both two-thirds. The first line 111 is a line having the first length, which is a first distance the grabbing device 21 moves in the third time period ($T_3$), which is 1.2 seconds in this scenario, and the second line 112 is another line having the second length, which is a second distance the grabbing device 21 moves in the fourth time period ($T_4$), which is 1.0 second in this scenario. The values of the first time period ($T_1$), the second time period ($T_2$), the first predetermined value (x), and the second predetermined value (y) may vary and should not be limited to the above-mentioned example.

Figure 6:
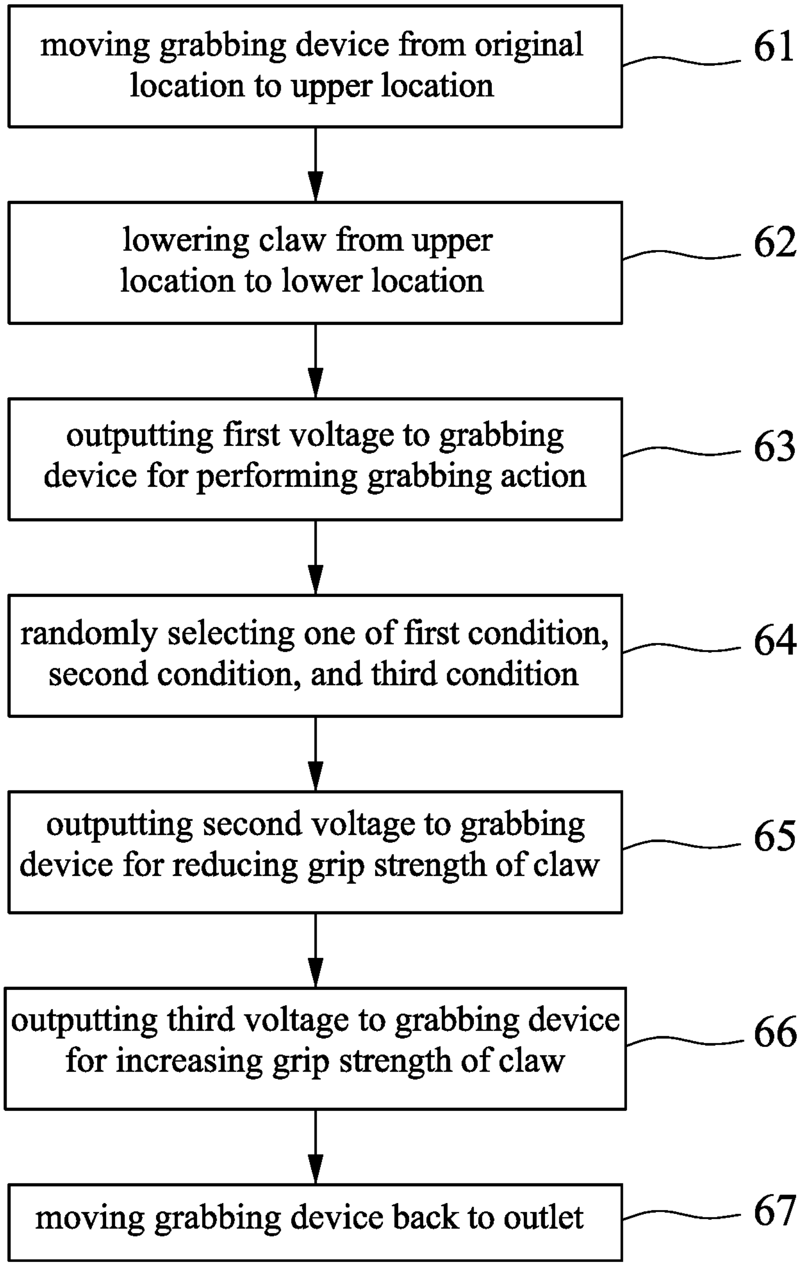
FIG. 6 is a flow chart illustrating a method of operating a game machine according to an embodiment of the disclosure.

Referring to FIG. 6, the method of operating the game machine 2 according to an embodiment of the disclosure includes the following steps. In step 61, when a game begins, the driving device 22 moves the grabbing device 21 horizontally from an original location in the start zone 10 to an upper location in the playing field 11, 13 in response to a user's operation. It should be noted that the upper location is determined by the user and is generally above a desired one of the objects 23. Then, in step 62, the driving device 22 releases the string 211 to lower the claw 212 from the upper location to a lower location in the playing field 11, 13. In step 63, when the claw 212 is lowered to the lower location, the driving device 22 outputs a first voltage to the grabbing device 21 for the claw 212 to perform a grabbing action for grabbing one of the objects 23.

After performing the grabbing action, the driving device 22 starts to pull the claw 212 back to the upper position, and moves the grabbing device 21 back to the start zone 10, during which the driving device 22 outputs a second voltage that is smaller than the first voltage to the grabbing device 21 for reducing the grip strength of the claw 212.

Specifically, before the driving device 22 pulls the claw 212 back up by two-thirds of a length that is released by the string 211, in step 64, the driving device 22 randomly selects one of a first condition where the claw 212 is pulled back by substantially two-thirds of the length that is released by the string 211, a second condition where the claw 212 is fully pulled back by the string 211 to the upper location, and a third condition where the grabbing device 21 is moved to the drop zone 11. Then, in step 65, the driving device 22 outputs the second voltage to the grabbing device 21 upon occurrence of a selected one of the first, second and third conditions after performing the grabbing action. It should be noted that step 64 may be performed at any time before performing step 65.

Then, in step 66, the driving device 22 outputs a third voltage that is greater than the second voltage and smaller than the first voltage to the grabbing device 21 for increasing the grip strength of the claw 212 after outputting the second voltage for a predetermined time period. In this embodiment, the predetermined time period is 100 milliseconds. It should be noted that the predetermined time period may vary and should not be limited to the abovementioned example. Finally, in step 67, the driving device 22 moves the grabbing device 21 back to the start zone 10 and stops outputting the third voltage to the claw 212 so as to release the claw 212.

The grip strength of the claw 212 may be set during a setup procedure. The cabinet 24 is formed with an outlet 25 at the start zone 10, and the game machine 2 further includes a sensor 26 that is disposed adjacent to the outlet 25 for detecting an object passing through the outlet 25. For example, the sensor 26 is a passive infrared sensor. In the setup procedure, the driving device 22 outputs a max voltage to the grabbing device 21 for grabbing one of the objects 23, moves the grabbing device 21 to the original location in the start zone 10 above the outlet 25, and gradually decreases voltage outputted to the grabbing device 21 from the max voltage for dropping the object 23 from the grabbing device 21 to the outlet 25. The driving device 22 then obtains a loose voltage that is outputted to the grabbing device 21 at the moment when the sensor 26 detects the object 23 passing through the outlet 25. After the driving device 22 obtains the loose voltage, the driving device 22 calculates the first voltage, the second voltage, and the third voltage respectively by adding together the loose voltage and a first value, subtracting a second value from the loose voltage, and subtracting a third value from the loose voltage.

It should be noted that when the objects 23 that were placed in the playing field 11, 13 are replaced with another kind of object, the loose voltage may be different but is greater than 1 volt and smaller than the max voltage. The first value, the second value, and the third value may be different for different objects based on the loose voltage obtained by the sensor 26, but should not be greater than the loose voltage thus obtained.

Figure 3:
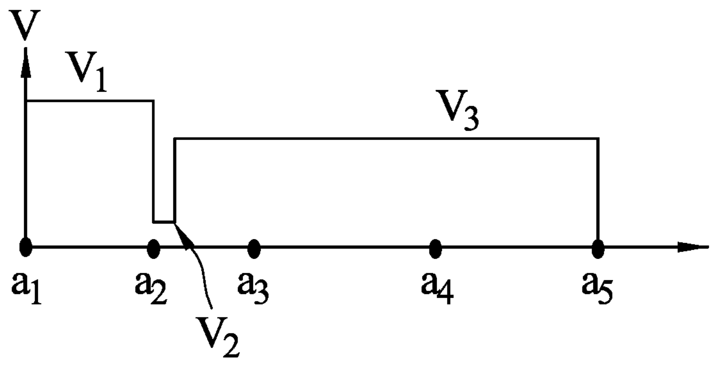
FIG. 3 is a plot illustrating a relation between voltage and position of a grabbing device of the game machine operating in a first mode.

Referring to FIG. 3 for illustrating the game machine 2 operating in a first mode. When the game begins (i.e., when the grabbing device 21 begins to move under the user's control), the driving device 22 selects the first condition where the claw 212 is pulled back by substantially two-thirds of the length that is released by the string 211, thus making the game machine 2 to operate in the first mode. In the first mode, when the claw 212 is lowered to the lower location ($a_1$), the driving device 22 outputs the first voltage ($V_1$) to the grabbing device 21 for the claw 212 to perform the grabbing action, and then the claw 212 is pulled back to the upper location ($a_3$) after the grabbing action is completed. During ascent of the claw 212 from the lower location ($a_1$) to the upper location ($a_3$), the driving device 22 outputs the second voltage ($V_2$) to the grabbing device 21 for reducing the grip strength of the claw 212 when the claw 212 is pulled back by substantially two-thirds of the length that is released by the string 211 to an intermediate location ($a_2$) between the lower location ($a_1$) and the upper location ($a_3$). After the second voltage is outputted for the predetermined time period and before the claw 212 is fully pulled back by the string 211 to the upper location ($a_3$), the driving device 22 outputs the third voltage ($V_3$) to the grabbing device 21 until the grabbing device 21 has returned to the original location ($a_5$) in the start zone 10 above the outlet 25. The first mode provides the user with a game experience that the object 23 has just been grabbed by the claw 212, but the grip force of the claw 212 appears to be not firm enough to hold the object 23 tightly, causing the object 23 to drop from shaking while the claw 212 is being pulled up to the upper location.

Figure 4:
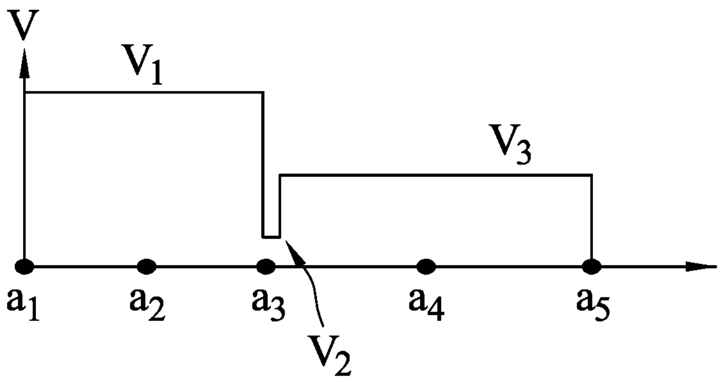
FIG. 4 is a plot illustrating a relation between voltage and position of the grabbing device operating in a second mode.

Referring to FIG. 4 for illustrating the game machine 2 operating in a second mode. When the game begins, the driving device 22 selects the second condition where the claw 212 is fully pulled back by the string 211 to the upper location, thus making the game machine 2 to operate in the second mode. In the second mode, when the claw 212 is lowered to the lower location ($a_1$), the driving device 22 outputs the first voltage ($V_1$) to the grabbing device 21 for the claw 212 to perform the grabbing action, and then the claw 212 is pulled back to the upper location ($a_3$) after the grabbing action is completed. The driving device 22 continues to output the first voltage ($V_1$) to the grabbing device 21 during ascent of the claw 212 from the lower location ($a_1$) through the intermediate location ($a_2$) to the upper location ($a_3$), and then outputs the second voltage ($V_2$) to the grabbing device 21 for reducing the grip strength of the claw 212 when the claw 212 is fully pulled back by the string 211 to the upper location ($a_3$). After the second voltage ($V_2$) is outputted for the predetermined time period, the driving device 22 outputs the third voltage ($V_3$) to the grabbing device 21 until the grabbing device 21 has returned to the original location ($a_5$) in the start zone 10 above the outlet 25. The second mode provides the user with a game experience that the object 23 is grabbed by the grabbing device 21, but an reaction force of the claw 212 being pulled to the upper location appears to cause the object 23 to drop from the claw 212.

Figure 5:
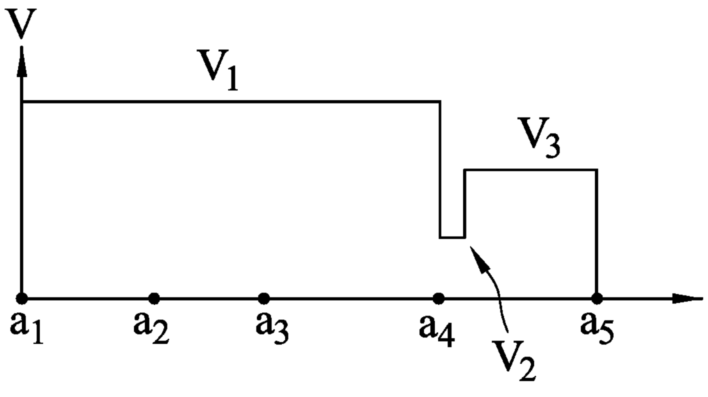
FIG. 5 is a plot illustrating a relation between voltage and position of the grabbing device operating in a third mode.

Referring to FIG. 5 for illustrating the game machine 2 operating in a third mode. When the game begins, the driving device 22 selects the third condition where the grabbing device 21 is moved to the drop zone 11, thus making the game machine 2 to operate in the third mode. In the third mode, when the claw 212 is lowered to the lower location ($a_1$), the driving device 22 outputs the first voltage ($V_1$) to the grabbing device 21 for the claw 212 to perform the grabbing action, and then the claw 212 is pulled back to the upper location ($a_3$) after the grabbing action is completed. The driving device 22 continues to output the first voltage ($V_1$) to the grabbing device 21 when the claw 212 is pulled back to the upper location ($a_3$) and moved toward the start zone 10, and outputs the second voltage ($V_2$) to the grabbing device 21 for reducing the grip strength of the claw 212 when the grabbing device 21 is moved to a drop location ($a_4$) in the drop zone 11. After the second voltage ($V_2$) is outputted for the predetermined time period, the driving device 22 outputs the third voltage ($V_3$) to the grabbing device 21 until the grabbing device 21 has returned to the original location ($a_5$) in the start zone 10 above the outlet 25. The third mode provides the user with a game experience that the object 23 is grabbed by the grabbing device 21, but an inertia of the horizontal movement of the claw 212 while moving to the start zone 10 appears to cause shaking that makes the object 23 to drop from the claw 212.

It should be noted that the driving device 22 may include a first motor that is configured to pull and release the string 211, a second motor that is configured to move the grabbing device 21 horizontally, a voltage regulator or voltage generator that is configured to output the first, second and third voltages, and a processing unit (e.g., a processor, a microprocessor, a microcontroller, a system on a chip, and the like) that is configured to compute the first voltage, the second voltage, and the third voltage based on the loose voltage, to select one of the first mode, the second mode, and the third mode for the game machine 2 to operate in, and to determine timing of outputting the first voltage, the second voltage, and the third voltage to the grabbing device 21. It should be further noted that if the upper location for releasing the claw 212 is in the drop zone 11, the operation of the game machine 2 in the third mode would be identical to that in the second mode (i.e., in both the second mode and the third mode, the driving device 22 outputs the second voltage when the claw 212 is fully pulled back to the upper location ($a_3$)).

In summary, after the grabbing device 21 performs the grabbing action, when the grabbing device 21 is moving back to the outlet 25 that is in the start zone 10, the driving device 22 outputs one of the first voltage, the second voltage, and the third voltage to the claw 212 based on the selected one of the first, second and third conditions, thus creating different game experiences for the user. In addition, by virtue of the sensor 26 detecting the loose voltage, and by virtue of calculating the first voltage, the second voltage, and the third voltage based on the loose voltage, accuracy and efficiency of adjusting the grip strength of the claw 212 is improved compared to adjusting the grip strength of the claw 212 manually.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method of operating a game machine, the game machine including a grabbing device, a driving device, and a cabinet that defines an inner space, the grabbing device including a string having one end connected to the driving device, and a claw fixedly connected to the other end of the string, the inner space having a start zone and a playing field, the playing field allowing an object to be placed therein and having a main zone, and a drop zone between the start zone and the main zone, the method comprising steps of:

the driving device moving the grabbing device horizontally from an original location in the start zone to an upper location in the playing field, and then releasing the string to lower the claw from the upper location to a lower location in the playing field;

when the claw is lowered to the lower location, the driving device outputting a first voltage to the grabbing device for the claw to perform a grabbing action;

after performing the grabbing action, the driving device outputting a second voltage that is smaller than the first voltage to the grabbing device for reducing grip strength of the claw; and the driving device outputting a third voltage that is greater than the second voltage and smaller than the first voltage to the grabbing device for increasing the grip strength of the claw after outputting the second voltage for a predetermined time period, wherein the step of the driving device outputting a second voltage includes:

randomly selecting one of a first condition where the claw is pulled back by substantially two-thirds of a length that is released by the string, a second condition where the claw is fully pulled back by the string to the upper location, and a third condition where the grabbing device is moved to the drop zone; and outputting the second voltage to the grabbing device upon occurrence of a selected one of the first, second and third conditions.

2. The method as claimed in claim 1, the inner space having a rectangular top view and four corners, the method further comprising steps of:

the driving device moving the grabbing device horizontally along a boundary of the inner space from a first one of the four corners to a second one of the four corners that is adjacent to the first one of the four corners to obtain a first time period;

the driving device moving the grabbing device horizontally along the boundary of the inner space from the first one of the four corners to a third one of the four corners that is adjacent to the first one of the four corners and that is opposite to the second one of the four corners to obtain a second time period; and the driving device defining the drop zone based on the first time period and the second time period.

3. The method as claimed in claim 2, wherein the drop zone is defined by a first line that has a first length which will take the grabbing device a third time period to move, and a second line that is perpendicular to the first line and that has a second length which will take the grabbing device a fourth time period to move, the third time period being equal to the first time period multiplied by a first predetermined value that is greater than zero and smaller than one, and the fourth time period being equal to the second time period multiplied by a second predetermined value that is greater than zero and smaller than one.

4. The method as claimed in claim 1, the cabinet being formed with an outlet at the start zone, the game machine further including a sensor disposed adjacent to the outlet for detecting an object passing through the outlet, wherein the method further comprises a setup procedure including steps of:

the driving device outputting a max voltage to the grabbing device for grabbing the object;

the driving device moving the grabbing device to the start zone above the outlet; and the driving device gradually decreasing voltage outputted to the grabbing device from the max voltage for dropping the object from the grabbing device to the outlet, and obtaining a loose voltage that is outputted to the grabbing device at a moment when the sensor detects the object passing through the outlet.

5. The method as claimed in claim 4, further comprising a step of the driving device calculating the first voltage, the second voltage, and the third voltage, wherein the first voltage is calculated by adding together the loose voltage and a first value, the second voltage is calculated by subtracting a second value from the loose voltage, and the third voltage is calculated by subtracting a third value from the loose voltage.

6. The method as claimed in claim 1, wherein the driving device outputs the second voltage upon occurrence of the first condition where the claw is pulled back by substantially two-thirds of a length that is released by the string.

7. The method as claimed in claim 1, wherein the driving device outputs the second voltage upon occurrence of the second condition where the claw is fully pulled back by the string to the upper location.

8. The method as claimed in claim 1, wherein the driving device outputs the second voltage upon occurrence of the third condition where the grabbing device is moved to the drop zone.

9. A method of operating a game machine, the game machine including a grabbing device, a driving device, and a cabinet that defines an inner space, the grabbing device including a string having one end connected to the driving device, and a claw fixedly connected to the other end of the string, the inner space having a start zone and a playing field, the playing field allowing an object to be placed therein and having a main zone, and a drop zone between the start zone and the main zone, the inner space having a rectangular top view and four corners, the method comprising steps of:

the driving device moving the grabbing device horizontally from an original location in the start zone to an upper location in the playing field, and then releasing the string to lower the claw from the upper location to a lower location in the playing field;

when the claw is lowered to the lower location, the driving device outputting a first voltage to the grabbing device for the claw to perform a grabbing action;

after performing the grabbing action, the driving device outputting a second voltage that is smaller than the first voltage to the grabbing device for reducing grip strength of the claw;

the driving device outputting a third voltage that is greater than the second voltage and smaller than the first voltage to the grabbing device for increasing the grip strength of the claw after outputting the second voltage for a predetermined time period;

the driving device moving the grabbing device horizontally along a boundary of the inner space from a first one of the four corners to a second one of the four corners that is adjacent to the first one of the four corners to obtain a first time period;

the driving device moving the grabbing device horizontally along the boundary of the inner space from the first one of the four corners to a third one of the four corners that is adjacent to the first one of the four corners and that is opposite to the second one of the four corners to obtain a second time period; and the driving device defining the drop zone based on the first time period and the second time period.

10. The method as claimed in claim 9, wherein the drop zone is defined by a first line that has a first length which will take the grabbing device a third time period to move, and a second line that is perpendicular to the first line and that has a second length which will take the grabbing device a fourth time period to move, the third time period being equal to the first time period multiplied by a first predetermined value that is greater than zero and smaller than one, and the fourth time period being equal to the second time period multiplied by a second predetermined value that is greater than zero and smaller than one.

11. The method as claimed in claim 9, the cabinet being formed with an outlet at the start zone, the game machine further including a sensor disposed adjacent to the outlet for detecting an object passing through the outlet, wherein the method further comprises a setup procedure including steps of:

the driving device outputting a max voltage to the grabbing device for grabbing the object;

the driving device moving the grabbing device to the start zone above the outlet; and the driving device gradually decreasing voltage outputted to the grabbing device from the max voltage for dropping the object from the grabbing device to the outlet, and obtaining a loose voltage that is outputted to the grabbing device at a moment when the sensor detects the object passing through the outlet.

12. The method as claimed in claim 11, further comprising a step of the driving device calculating the first voltage, the second voltage, and the third voltage, wherein the first voltage is calculated by adding together the loose voltage and a first value, the second voltage is calculated by subtracting a second value from the loose voltage, and the third voltage is calculated by subtracting a third value from the loose voltage.

* * * * *